United States Patent [19]

Gates et al.

[11] 3,837,370

[45] Sept. 24, 1974

[54] METHOD FOR MAKING A PIPE REINFORCING CAGE

[75] Inventors: Robert H. Gates, Columbus; Harold G. Schneider, Westerville, both of Ohio

[73] Assignee: Concrete Pipe Machinery Company, Sioux City, Iowa

[22] Filed: Sept. 15, 1972

[21] Appl. No.: 289,740

Related U.S. Application Data

[63] Continuation of Ser. No. 135,093, April 19, 1971, abandoned.

[52] U.S. Cl. ............... 140/71 R, 140/107, 138/175
[51] Int. Cl. ............................................. B21f 27/20
[58] Field of Search ........ 138/177, 178, 175; 245/1, 245/2, 5; 140/71 R, 92.1

[56] References Cited
UNITED STATES PATENTS 3,578,036   5/1971   Francois .......................... 138/175 X

FOREIGN PATENTS OR APPLICATIONS 526,812   9/1940   Great Britain ..................... 138/175

Primary Examiner—Jerry W. Myracle
Attorney, Agent, or Firm—Strauch, Nolan, Neale, Nies & Kurz

[57] ABSTRACT

A pipe reinforcing cage comprises a cage unit and a bell assembly adapted for snap-on connection thereto. The bell assembly has spaced apart coaxial circular rings supported by longitudinal members attached thereto, the longitudinal members comprising the elongated end section of wire forms having an intermediate section and an opposite end section adapted to provide snap-on connection to the circumferential members of the cage unit. Said opposite end section has a tapered portion that contacts the first circumferential member of the cage unit as the bell unit is pushed into contact with said cage unit, causing the wire form to be deflected outward so as to pass toward and around said cage unit until a first loop section of the wire form is opposite said first circumferential member of the cage unit, at which point the wire form springs inward so that the said first circumferential member is positioned within said loop section. This loop section has a tapered portion on its backside. Further pushing of the bell assembly toward the cage unit results in deflection of the wire form again so that said bell assembly moves toward the cage unit until the second circumferential member of the cage unit is positioned opposite said first loop section and the first circumferential member is positioned opposite a second loop section of the wire form. At this point, the wire form springs back to its original orientation, with the circumferential members of the cage unit thus snapped into position within the respective loop sections of the wire form. The second loop section of the wire forms has a flat portion on its backside. The second loop section of the wire forms said flat portion being positioned perpendicular to the directions of movement of said bell assembly relative to the cage unit, i.e. parallel to the orientation of said circumferential members, and adapted to preclude further movement of the wire form around and past the cage unit. The bell assembly is thus held in fixed position with respect to the cage unit. The wire form also serves to act as a spacer to locate the cage unit to which it is attached at a desired distance from the outer shell of the pipe form and at a fixed distance from the pallet of said pipe form.

5 Claims, 4 Drawing Figures

PATENTED SEP 24 1974        3,837,370

INVENTORS
ROBERT H. GATES
BY HAROLD G. SCHNEIDER

ATTORNEY

METHOD FOR MAKING A PIPE REINFORCING CAGE

This application is a continuation of Ser. No. 135,093 filed April 19, 1971, now abandoned.

BACKGROUND OF THE INVENTION

1. Field of the Invention

The present invention relates to pipe reinforcing cages. More particularly, it relates to bell assemblies whose connection to associated cage units is facilitated in the production of completed reinforcing cages.

2. Description of the Prior Art

In the formation of concrete pipe sections, internal reinforcing cages are employed to strengthen the resulting pipe. Such reinforcing cages are formed by the manufacture of a cage unit suitable for the pigot portion of the pipe and a separate bell assembly suitable for use in the bell portion of the pipe. The cage units and the bell assemblies are generally joined, as by welding, to form the completed reinforcing cage. This operation requires the use of particular equipment during the assembly of the separator portions of the reinforcing cage and the time of a welder to properly weld said separate portions together. It will be appreciated, however, that in the field of concrete pipe production, there is an ever existing need and desire for minimizing the cost of the product pipe. As a result, there is a desire for simplification of the various elements of the pipe producing operation, including the formation of the reinforcing cage. More specifically, the time and expense required to weld the bell assembly to the cage unit is one element of the overall operation concerning which a simplified operation would serve the overall interests of the industry in producing high quality pipe at minimum cost of time and expense.

It is an object of the invention, therefore, to provide an improved pipe reinforcing cage.

It is another object of the invention to provide a pipe reinforcing cage in which the attachment of the bell assembly and the cage unit is facilitated.

It is another object to provide a bell assembly unit adapted to be connected to the cage unit without the necessity of welding said units together.

It is a further object of the invention to provide a wire form element adatped for use in bell assemblies capable of connection to cage units without welding thereof.

With these and other objects in mind, the invention is hereinafter described in detail, the novel features thereof being set forth in the appended claims.

SUMMARY OF THE INVENTION

The longitudinal support members for the circumferential members of the bell assembly of the invention comprise an elongated end section of novel wire forms that serve to permit the bell assembly to be snaped into fixed connection with the cage unit in the forming of a pipe reinforcing cage. Te opposite end of the wire forms are thus of such configuration that upon contact with the first circumferential member of the cage unit, as the bell assembly and the cage unit are pushed together, will deflect outward so that the wire forms pass over and around said first member of the cage unit. As the bell assembly is pushed closer to the cage unit, a point is reached at which said first member of the cage unit is positioned a first loop section of each wire form. At this position, the wire form springs back to its original orientation, the first circumferential member of the cage unit thereby being positioned within said first loop section of the wire form.

The backside of said first loop section is tapered so that further pressing of the bell assembly toward the cage unit causes the wire forms to again be deflected outward so that said wire forms can be pushed further past said first member of the cage unit. Such movement continues until the point is reached at which said first loop section of the wire forms is positioned opposite the next circumferential member of the cage unit and said first member of the cage unit is positioned opposite a second loop section of the wire form. In this position, the wire forms are able to spring back to their original orientation, in which position the above-mentioned members of the cage unit are positioned within said first and secod loop section of the wire form. The backside of the second loop section is not tapered, but has a flat portion that extends perpendicular to the direction of movement of said bell assembly, i.e. parallel to said circumferential members of the cage unit. The flat portion of the second loop section thus precludes further movement of the bell assembly toward the cage unit. The configuration of the novel wire form of the present invention, therefore, permits the ready positioning of the bell assembly and cage unit and the snap-on connection thereof to form a completed pipe reinforcing cage.

BRIEF DESCRIPTION OF THE DRAWINGS

The invention is hereinafter further described with reference to the accompanying drawings in which.

DETAILED DESCRIPTION OF THE INVENTION

The bell assembly of the present invention can be joined to a cage unit by simply pushing the two units together because of the novel wire forms employed as the longitudinal support members of the bell assembly. The extended end portions of the wire forms thus snap into fixed connection with the circumferential members of the cage unit so that the resulting combined reinforcing cage has a bell assembly and a cage unit not requiring welding or other such means for securing the two units together. Because of the configuration of the wire forms, the cage can also be located at a desired distanced from the outer shell of the pipe form and from the pallet of said form.

The wire form of the invention has an elongated end section that serves as a longitudinal support member for the circumferential members of the bell assembly, an intermediate section, and an opposite end section having a particular configuration that enables this end section to achieve snap-on connection with the cage unit. A plurality of such wire forms, typically four, will be employed in each bell assembly, the actual number of said forms employed being dependent on the diameter of the cage unit. The wire forms are positioned so that the elongated end section spaced apart coaxially positioned circumferential members at various points along the circumferential surfaces thereof. The plurality of wire forms thus have their opposite end sections extending therefrom so as to engage the cage unit and to snap into fixed position therewith at various points around the periphery of the cage as the bell assembly is pushed toward the cage unit.

Figure 1:
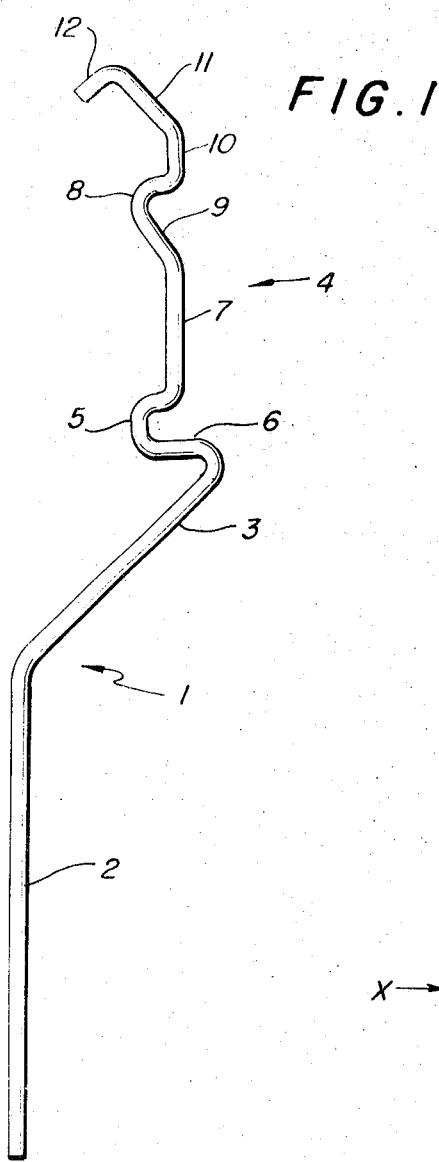
FIG. 1 is a side elevation view of a wire form member of the present invention.

Referring now to the wire form as shown in FIG. 1, the unitary wire form generally designated by the numeral 1 has an elongated end section 2 that acts as the longitudinal support members for circumferential members of the bell assembly employing said wire form 1. One end of elongated section 2 is, of course, one end of wire form 1, the opposite end of section 2 having a first intermediate section 3 extending therefrom. Intermediate section 3 extends at such an angle with respect to the line of extension of elongated end section 2 and for such length that the normal distance between the opposite end of section 3 and the line of extension of elongated end section 2, i.e. the perpendicular distance between the end of section 3 removed from section 2 and the line representng a straight extension of elongated section 2, is slightly greater than the desired radial distance between the outer longitudinal portion of the bell assembly and the ends of the circumferential members of the cage unit to which said bell assembly is to be attached. That is, said normal distance is slightly greater than the difference between the radius of the bell assembly and the radius of the cage unit, thereby permitting the opposite end section of the wire forms, generally designated by the numeral 4, to be properly positioned for snap-on connection to the cage unit as a result of the particular configuration of said opposite end section 4.

In this opposite end section 4, two loop sections are formed, said sections being separated by a distance equal to the distance between the first circumferential member of the cage unit at the end thereof to be attached to the bell assembly and the next succeeding circumferential member. A tapered section is provided in advance of said loop sections to enable the wire form to be deflected outward over and around the end circumferential member of the cage. The configuration of the loop sections is such that the wire form may be advanced to the point where the lead loop section is positioned around the second circumferential member of the cage unit and the second loop section is positioned around the end circumferential member of the cage unit. In this position, the bell assembly and the cage unit are securely fastened by a snap-on connection to form a completed reinforcing cage.

As shown in FIG. 1, end section 4 of wire form 1 has a first loop section 5 at the end thereof extending from intermediate section 3. Said loop section 5 has its curved portion positioned in the direction of the line of extension of elongated end section 2 so that said loop section 5 will be in proper position to receive the circumferential members of the cage unit. Said loop section 5, which is adapted to receive said circumferential members, has a flat portion 6 extending outwardly from the backside of said curved portion, i.e. the side closest to end section 2, to the end portion of said first intermediate member 3. Flat portion 6, as shown, is positioned in a direction generally perpendicular to the direction of extension of said elongated end section 2. Said portion 6 is thus positioned generally parallel to the position of the circumferential member to be positioned in first loop section 5 upon joining of the bell assembly and the cage unit.

Extending from the opposite end of loop section 5 is a second intermediate section 7, which extends in a direction generally parallel to the direction of extension of said elongated end section 2. The normal distance between said second intermediate section 7 and the line of extension of elongated end section 2, it will be seen, is less than the distance from the line of extension of said end section 2 to the point of communication between said flat portion 6 of said first loop section 5 and said first intermediate section 3 from which it extends.

At the opposite end of said second intermediate section 7 is second loop section 8, said section also being adapted to receive the end portions of the circumferential members of the cage unit. The curved portion of said second loop section 8 thus also extends in a direction toward the line of extension of end section 2. As previously indicated, the distance between second loop section 8 and first loop section 5 is the same as the distance between the first and second circumferential members of the cage unit on the end thereof to be attached to the bell assembly.

The backside of second loop section 8, unlike the flat portion 6 as described with reference to loop section 5, has a tapered portion 9 extending outwardly and joining said second intermediate section 7. This tapered portion will be at an angle such as to permit a circumferential member of the cage positioned in second loop section 8 to deflect the wire form outward upon pushing of the bell assembly and the cage unit so as to cause pressure contact between said tapered portion 9 and such a circumferential member of the cage.

Extending from the opposite end of second loop section 8 is third intermediate section 10. Said section 10 extends in a direction generally parallel to the direction of extension of said elongated end section 2 and said second intermediate section 7. The normal distance between third intermediate section 10 and the line of extension of elongated end section 2 is less than the distance from said line of extension of end section 2 to the point of communication between flat portion 6 of the first loop section 5 and first intermediate section 3 so as to facilitate the deflection of wire form 1 as the bell and cage units are joined.

In order to achieve said initial deflection, tapered section 11 extends from said third intermediate section 10 in a direction toward the line of extension of said elongated end section 2. The length and angle of extension of tapered section 11 is such that the normal distance between the end thereof and the line of extension of third intermediate section 10 is at least as great as the distance from the end of a circumferential member of the cage unit when held in loop section 8 to said line of extension of third intermediate section 10. Upon movement of the bell assembly toward the cage unit with said opposite end section 4 of wire forms 1 projecting toward the cage unit, tapered portion 11 will thus contact the first circumferential member of the cage unit causing the desired deflection of wire form 1. The length of tapered section 11, it will be appreciated, should on the other hand be less than that at which the end thereof is at a normal distance from the line of extension of said third elongated section 10 in excess of the distance between said third elongated section 20 and the longitudinal surface of the shell of the pipe form in which the reinforcing cage is to be inserted. While the end portion of tapered section 11 may constitute a second end section 12 of wire form 1, it is desirable that a separate end section 12 extending from said tapered section 11 provided, conveniently as shown in FIG. 1 with said end section 12 extending from tapered section 11 at a angle of about90° therefrom. Said second end section 12 tends to facilitate the positioning of the completed reinforcing cage in the outer shell of the pipe form with said cage being spaced from the outer shell at approximately the same distance at points around the periphery of the cage.

Figure 2:
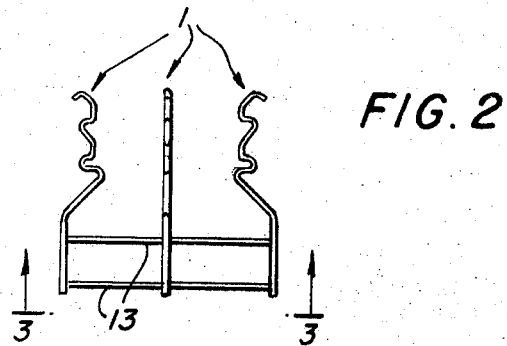
FIG. 2 is a side elevation of a bell assembly unit having two spaced apart circular members supported by longitudinal members comprising the wire form members of FIG. 1.
Figure 3:
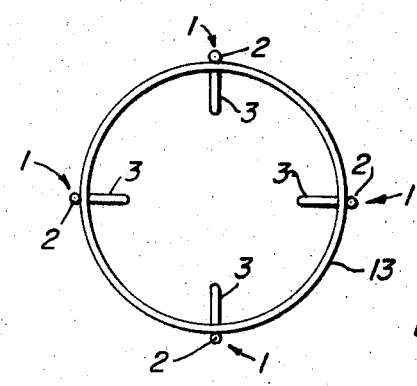
FIG. 3 is a view taken along the line 3—3 of said FIG. 2.
Figure 4:
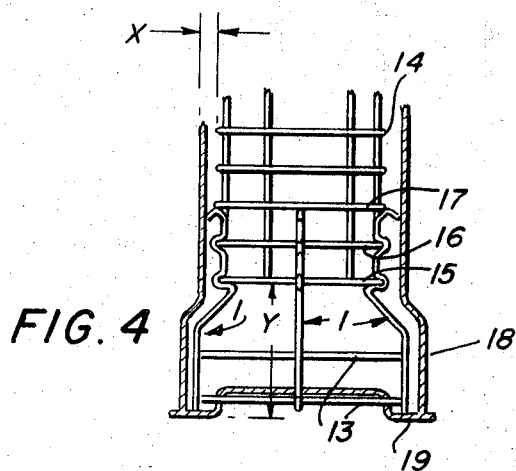
FIG. 4 is a side elevational view showing the bell assembly of FIG. 2 in snap-on connection with a cage unit to form a completed reinforcing cage inserted within the shell of a pipe form.

A plurality of wire forms 1 as described above are secured, as by welding, to spaced apart, coaxially positioned rings 13 to form a bell assembly as illustrated in FIGS. 2 and 3. Elongated end section 2 of each wire form 1 thus serves as a longitudinal support member for each ring 13, with said wire forms 1 being positioned at spaced apart points along the periphery of said rings 13, conveniently at 90° spacing as illustrated although other angular spacing may be employed. Any convenient number of rings 13 may be employed, each of said rings serving as a circumferential member of said bell assembly. As shown in FIGS. 3 and 4, each wire form 1 is positioned with the end section generally designated by the numeral 4 extending in the same direction from the bell cage proper so that the end section 4 of each wire form 1 acts with each other end section in the snap-on connection to the cage unit as herein provided.

FIG. 4 shows the bell assembly of FIG. 2 in snap-on connection to cage unit 14, the completed reinforcing cage comprising the joined bell assembly and cage unit being positioned within the outer shell 18 of a pipe form resting on pallet 19, the pipe being formed with its bell portion down. In this position, the reinforcing cage can conveniently be assembled by pushing cage unit 14 down onto the bell assembly positioned in the illustrated position with the elongated end sections 2 of each wire form 1 positioned on pallet 19. With the bell assembly and cage unit thus joined in snap-on connection, the end circumferential member 15 of cage unit 14 is positioned within first loop section 5 of each wire form 1, with the next succeeding circumferential member 16 similarly positioned within second loop section 8 of each said wire form 1. Second end section 12 of each wire from serves to assure that the reinforcing cage is positioned centrally within outer shell 18 of the pipe form, with the circumferential members of cage 14 positioned at a desired distance X from said outer shell 18 as shown on FIG. 4. By proper selection of the length of elongated sections 2 and first intermediate section 3 together with its angle of extension with respect to said section 2, wire forms 1 serve to control the distance Y between end circumferential members 15 of cage unit 14 from the bottom of pallet 19.

As indicated, the bell assembly and a cage unit of conventional design can readily be assembled by pushing the two units together with end section 4 of wire forms 1 extending from the bell assembly in the direction of the cage unit. It will be understood, of course, that the two units will be moved together in a generally coaxial manner so that said wire forms can contact and snap into position on the cage unit. Depending on whether the pipe with the reinforcing cage positioned therein is to be formed with its bell or its spigot section down, the reinforcing cage can conveniently be formed by initially positioning either the cage unit or the bell assembly on the pallet of the pipe form and pushing the other unit down thereon in the indicated manner. The units may also be formed in any desired manner to form the completed reinforcing cage and may thereafter be placed on the pallet. As the two units are pushed together, tapered section 11 of each wire form 1 contacts circumferential member 15 of the cage unit causing each said form 1 to be deflected outward around and past said member 15. When wire forms 1 have advanced to the point at which second loop section 8 of each wire form is positioned opposite member 15, wire forms 1 will spring back to their original orientation with said member 15 positioned in said loop section 8. As the units are pushed together thereafter, tapered portion 9 on the backside of each loop section 8 will cause wire forms 1 to again be deflected outward so that the wire forms move over and around the circumferential members of the cage unit to the point where said loop sections 8 and positioned opposite circumferential member 16 of the cage unit and loop sections 5 are positioned opposite said member 15. In this position, wire forms 1 will again spring back into snap-on connection with the cage unit, circumferential member 16 being positioned within loop section 8 and member 15 being within loop section 5. Because of flat portion 6 of the wire forms, the bell assembly cannot be moved further in the direction of the cage unit, and said units are securely joined in snap-on connection. Depending on the length of third intermediate section 10, tapered section 11 may, when such snap-on connection is made, already have contacted the next circumferential member of the cage unit, i.e. member 17, so as to cause a slight deflection of said tapered section 11 so that end section 12 is moved outward slightly to assure the desired positioning of the completed cage within outer shell 18. It will be appreciated, however, that the length of tapered section 11 and end section 12 may be such that the end section is at its desired position without such slight deflection of tapered section 11. i.e third intermediate section 10 need not be of sufficient length to assure a slight deflection of tapered section 11 when wire form 1 is in snapped-on connection to the cage unit. It is generally preferable that no deflection of said section 11 occur in the final position of the wire form to avoid distortion of the cage and to assure proper positioning with respect to the pipe form.

The novel unitary wire form of the present invention is constructed of any suitable material having sufficient elastic characteristics to permit the deflection thereof as indicated above without exceeding its elastic limit so as to cause permanent set or yield. The wire form should be able, in other words, to spring back to achieve snap-on connection in the manner disclosed. It has been found convenient to utilize a steel having an elastic limit of about 65,000 psi or higher with values commonly about 75,000 psi, although steel or other materials can be used having yield points outside this range so long as the desired deflection and spring action can take place when the wire form is pressed into contact with the cage unit. The material employed should be weldable, of course, if the wire forms are to be welded to the circumferential members of the bell assembly. The American Society for Testing and Materials Standard Specification C76–78 on reinforced concrete culvert storm drain and sewer pipe specifies steel reinforcement bars conforming to ASTM Spec. A82, this material also being the strongest and most practical choice of materials.

The novel wire form of the invention can be produced in any convenient manner known in the art to produce a unitary form having the configuration disclosed and claimed herein. It has been found particularly convenient to form the wire forms by means of a progressive die adapted to produce the desired configuration as will be readily appreciated by those skilled in the art. Cold drawn wire or rod material can thus be employed to form unitary wire forms, generally coplaner, having the desired configuration for use in the practice of the present invention.

It will be appreciated that various modifications can be made in the details of the invention, particularly the novel wire form, within the scope of the claimed invention. As previously indicated, for example, tapered portion 5 of loop section 4 can be made at any convenient angle of extension such that pressure caused by a circumferential member of the cage unit will cause deflection of the wire form in the outward direction as desired. Tapered portion 5, for this purpose, will generally extend at an angle of from about 20° to about 70°, more conveniently about 30° to about 60°, with respect to the line of extension of second intermediate section 7. An angle of about 45° is particularly convenient. Similarly, tapered section 11 is positioned at any convenient angle with respect to third intermediate section 10 such that the wire form will be deflected outward upon contact of said section 11 with the first circumferential member of the cage unit. Thus, angles of extension such as those mentioned above can be conveniently employed.

The length of elongated end section 2 can be made such that any desired number of circumferential members can conveniently be employed in the bell assembly, the length of section 2 and intermediate section 3 and thus the positioning of first loop section 5 controlling the distance the cage unit is positioned from the end of the combined cage at the bell assembly end thereof. Likewise, the length of tapered section 11 and end section 12, if said section 12 extends therefrom at an angle, will control the spacing of the cage unit from the outer shell of the pipe form. The flat portion 6 of first loop section 5 will be either perpendicular to the direction of movement of the bell assembly, i.e. generally perpendicular to the line of extension of elongated end section 2 and second intermediate section 7 so that it serves to prevent further movement of the wire form relative to the cage unit by pressing against the end circumferential member of said cage unit.

Bell assemblies have been made in accordance with the present invention with four wire forms equally spaced around the periphery of coaxially spaced circumferential members, elongated end sections 2 serving as longitudinal support members for said circumferential members. The wire forms were made from approximately ¼ inch cold drawn steel wire ASTM spec. A82 by passage through a progressive die adapted to achieve the desired configuration of the resultant wire form. Elongated end section 2 was 6⅝ and the normal distance from the end of said section 2 to first loop section 5 was about 9⅞ inches. The distance between the loop sections was about 3 inches, tapered portion 9 of loop section 8 and tapered section 11 being at angles of about 45°. Said tapered section 11 was about 1⅛ in length with end section 12 extending therefrom at an angle of about 90° with a length of about ½. The bell assembly with said wire forms was readily snapped-on to a cage unit having a 3 inches longitudinal spacing between the circumferential members of the cage unit. The completed reinforcing cage was conveniently positioned within the outer shell of the pipe form in the desired position for placement within concrete pipe sections produced in the form.

By means of the present invention, bell assembly units can be produced that are conveniently joined to conventional cage unit quickly and conveniently by a single operator without the necessity of any special training or skill, obviating the necessity for employing a welder and the use of the welding and other equipment otherwise required to join a bell assembly to a cage unit in conventional practice. The step of forming a completed reinforcing cage by the joining of the two units is greatly simplified in this manner, resulting in a significant reduction of time and expense in this operation. In addition, the convenient spacing of the units as provided by the novel wire form enhances the advantages to the art resulting from the practice of the present invention. In the manufacture of conrete pipe, the advantages obtained by the present invention represent important practical features of commercial interest in the low cost production of quality pipe products.

While the invention has been described herein with reference to particular embodiments thereof, it will be appreciated that various changes and modifications can be made without departing from the scope of the invention as set forth in the appended claims.

Therefore, we claim:

1. A method of assembling a bell cage assembly and a cage unit to form a pipe reinforcing cage comprising:
   a. forming a cage unit having coaxially positioned circular circumferential members and a plurality of wire form longitudinal support members secured to said circular members at various points along the circumference thereof;
   b. forming a bell cage assembly having coaxial positioned circular circumferential members and a plurality of wire form longitudinal support members secured to said circular members of the bell cage at various points along the circumference thereof, said bell cage circular members having a diameter larger than the diameter of the circular members of the cage unit; and
   c. snap-fitting the bell cage assembly onto the cage unit.

2. The method of claim 1 wherein a portion of said longitudinal support members of the bell cage assembly are snap-fitted to extend about the outer periphery of at least one circumferential member of the cage unit.

3. The method of claim 1 wherein the bell cage assembly and the cage unit are moved together coaxially so that a portion of the longitudinal support members of the cage assembly overlap at least one of the circumferential members of the cage unit to snap-fit thereabout.

4. The method of claim 1 wherein each wire form carries at least one loop and wherein the method includes the step of snap-fitting the loop about one of the circumferential cage unit members.

5. A method of assembling a bell assembly and a cage unit to form a pipe reinforcing cage comprising:
   a. forming a cage unit having coaxial positioned circular circumferential members and a plurality of wire form longitudinal support members secured to said circular members at various points along the circumference thereof;
   b. forming a bell cage assembly having coaxial positioned circumferential members and a plurality of wire form longitudinal support members secured to said circular members of the bell cage assembly at various points along the circumference thereof, said bell cage assembly members having a diameter larger than the diameter of the circumferential members of the cage unit, each of said wire form members comprising:
      1. an outer longitudinal bell section member comprising an elongated end section of said form member, one end thereof constituting the end portion of said wire form member, said coaxially positioned circular members being secured to said elongated end section of each wire form member at spaced-apart points along the length thereof;
      2. a first intermediate section extending outward at an angle from the opposite end of said elongated section, the length of said first intermediate section and its angle of extension with respect to said elongated end section being such that the normal distance between the end portion of said intermediate section removed from said elongated end section and the line of extension of said end section is slightly greater than the desired radial distance between the outer longitudinal portion of a bell assembly and the ends of the circumferential members of the cage unit to which said bell assembly is to be attached;
      3. a first loop section extending from the end of said first intermediate section, said loop section being adapted to receive the circumferential members of said cage unit, said loop section having a flat portion extending outwardly from the curved portion thereof to the end portion of said first intermediate member, said flat portion being in a direction generally perpendicular to the direction of extension of said elongated end section;
      4. a second intermediate section extending from the opposite end of said first loop section in a direction generally parallel to the direction of extension of said elongated end section, the normal distance between said second intermediate section and the line of extension of said elongated end section being less than the distance from said line of extension to the point of communication between the flat portion of the first loop section and said first intermediate section;
      5. a second loop section extending from the end of said second intermediate section, said loop section being adapted to receive said circumferential members of said cage unit, said loop section having a tapered portion extending from the curved portion thereof to the end portion of the second intermediate section, the distance between said first and second loop sections corresponding to the distance between adjoining circumferential members of said cage unit;
      6. a third intermediate section extending from the opposite end of said second loop section in a direction generally parallel to the direction of extension of said elongated end section, the normal distance between said third intermediate section and the line of extension of said elongated end section being less than the distance from said line of extension to the point of communication between the flat portion of said first loop section and said first intermediate section;
      7. a tapered section extending from said third intermediate section in a direction toward the line of extension of said elongated end section, the length and angle of extension of said tapered section being such that the normal distance between the end thereof and the line of extension of said third intermediate section is at least as great as the distance from the end of the circumferential members of the cage unit when held in said loop sections to the line of extension of said third intermediate section, the length of said tapered section being less than that at which the end thereof is at a normal distance from the line of extension of said third elongated section in excess of the distance between said third elongated section and the longitudinal surface of the outer shell of the pipe form in which said reinforcing cage is to be inserted;
      8. a second end section constituting the second end portion of said wire form member; and
   C. snap-fitting the bell cage assembly on to the cage unit such that the cage unit and the bell assembly are held in snap-on connection, the tapered section and the tapered portion of said second loop section of each wire form permitting said wire forms to first move to a position in which the end circumferential member of said cage unit is positioned in the second loop section of each form as the cage unit and the bell assembly are pressed together and then to be removed therefrom as said cage unit and bell assembly are continued to be pressed together, said bell assembly being snapped into secure position with respect to the cage unit when the end circumferential member of the cage unit is positioned in said first loop section of each wire form, further movement of said bell assembly being precluded by the flat portion of said first loop section, the second circumferential member of the cage unit then being positioned in the second loop section of each wire form to secure said cage unit and said bell assembly into a unitary reinforcing cage.

* * * * *